United States Patent [19]
Wapner et al.

[11] Patent Number: 6,152,181
[45] Date of Patent: Nov. 28, 2000

[54] MICRODEVICES BASED ON SURFACE TENSION AND WETTABILITY THAT FUNCTION AS SENSORS, ACTUATORS, AND OTHER DEVICES

[75] Inventors: Phillip G. Wapner; Wesley P. Hoffman, both of Palmdale, Calif.

[73] Assignee: The United States of America as represented by the Secretary of the Air Force, Washington, D.C.

[21] Appl. No.: 09/004,703

[22] Filed: Jan. 8, 1998

Related U.S. Application Data

[63] Continuation-in-part of application No. 08/649,861, May 10, 1996, Pat. No. 5,789,045, which is a continuation of application No. 08/472,575, Jun. 7, 1995, abandoned, which is a continuation-in-part of application No. 08/229,962, Apr. 15, 1994, which is a continuation-in-part of application No. 07/980,317, Nov. 16, 1992, Pat. No. 5,352,512.

[51] Int. Cl.[7] .................................................. F15B 21/00
[52] U.S. Cl. ..................... 137/807; 137/807; 137/833; 137/842; 137/554; 73/734
[58] Field of Search ..................... 137/807, 833, 137/842, 554, 15, 1, 14; 73/724, 725, 734

[56] References Cited

U.S. PATENT DOCUMENTS

| | | |
|---|---|---|
| 3,149,492 | 9/1964 | Weinberg ................................. 73/724 |
| 4,460,018 | 7/1984 | Sweeney ................................. 137/807 |
| 4,815,472 | 3/1989 | Wise et al. ............................... 73/724 |
| 5,471,723 | 12/1995 | Luder et al. ............................. 73/724 |
| 5,789,045 | 8/1998 | Wapner et al. ....................... 137/513.7 |

*Primary Examiner*—A. Michael Chambers
*Attorney, Agent, or Firm*—Stanton E. Collier; Charles E. Bricker; Thomas L. Kundert

[57] ABSTRACT

Microdevices based on surface tension and wettability are useful as sensors, detectors, actuators, pumps, among other applications. As sensors and detectors they can respond to numerous stimuli such as pressure, temperature, gravity, rotation, acceleration, oscillation, chemical environments, magnetic fields, electric fields, radiation, and particle beams with a great choice of output options. Because of their design, they can be used in a broad range of temperatures and environments. Additionally, unlike other microsensors and detectors, these devices can be exposed to forces and pressures orders of magnitudes greater than their design limit and still return to their original accuracy and precision. These microdevices are also useful as actuators, pumps, valves and shutters. It is possible by joining these devices together to form complex devices that are able to control macroscopic flows for example. They are also able to perform complex electrical switching operations.

51 Claims, 12 Drawing Sheets

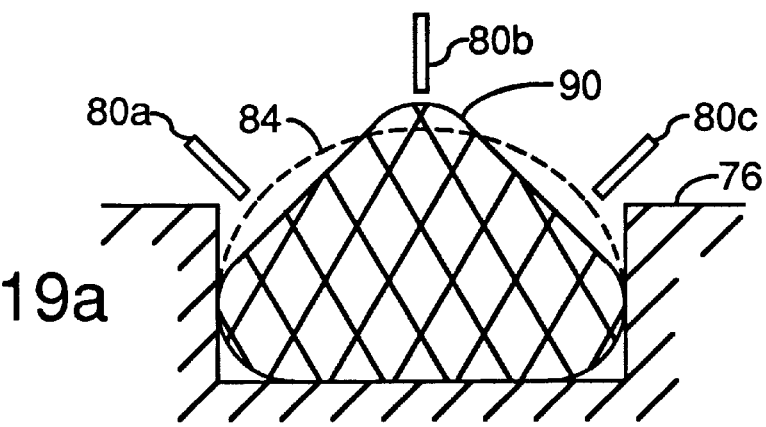
FIG. 19a
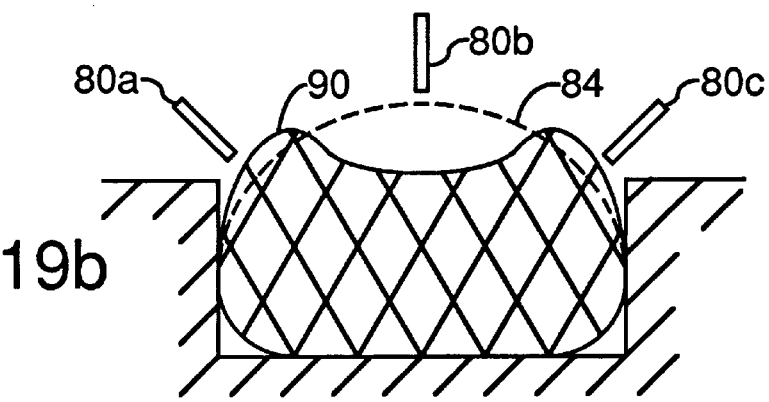
FIG. 19b
FIG. 20a
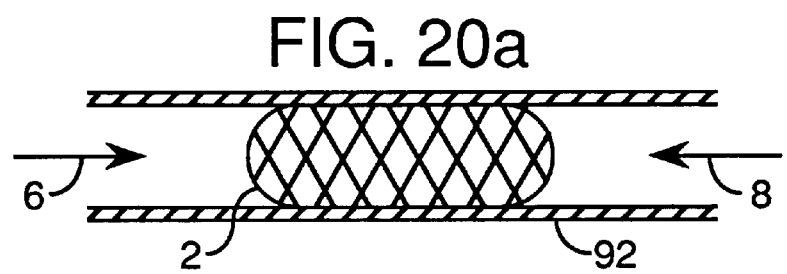
FIG. 20b
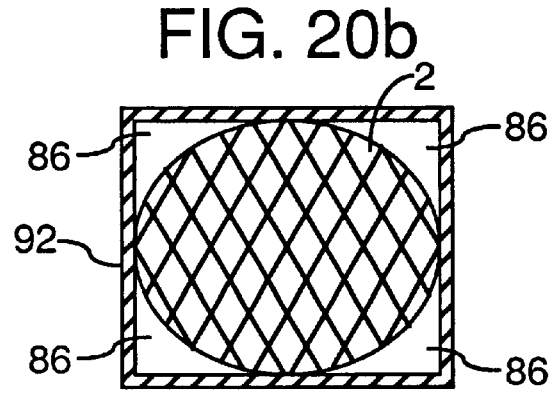

MICRODEVICES BASED ON SURFACE TENSION AND WETTABILITY THAT FUNCTION AS SENSORS, ACTUATORS, AND OTHER DEVICES

CROSS-REFERENCES TO RELATED APPLICATIONS

This patent application is a continuation-in-part of U.S. patent application Ser. No. 08/649,861, filed May 10, 1996, now U.S. Pat. No. 5,789,045, which is a continuation of U.S. patent application Ser. No. 08/472,575, filed Jun. 7, 1995 abandoned, which is a continuation-in-part of 08/229,962 filed Apr. 15, 1994 allowed, which is a continuation-in-part of U.S. patent application Ser. No. 07/980,317, filed Nov. 16, 1992, now issued as U.S. Pat. No. 5,352,512. This patent application further incorporates U.S. patent application Ser. No. 08/472,574, which is a C.I.P. patent application of U.S. patent application Ser. No. 08/229,962 as noted hereinabove.

STATEMENT REGARDING FEDERALLY SPONSORED RESEARCH OR DEVELOPMENT

The invention described herein may be manufactured and used by or for the Government for governmental purposes without the payment of any royalty thereon.

BACKGROUND OF THE INVENTION

The development of photolithography in 1959 ushered in a new age for the electronics industry. Computers began to shrink from auditorium-sized behemoths to desktop-sized personal computers with accompanying increases in actual speed and computing power. The crown jewel of this revolutionary technological feat was, and still is, the microchip. Fabricated out of silicon and etched and coated using optical masks, the microchip changed the way engineers and scientists viewed the need for physical-device size in relation to actual task requirements. For example, adding machines and calculators were no longer viewed as having to have large keyboards and complicated mechanical apparatus, as well as accompanying hefty physical mass. The ubiquitous hand-held calculator is one result of this change in viewpoint. Occurring concurrently with this revolution in electronics technology, and mostly because of it, miniaturization of many other technologies started taking place, and currently, is revolutionizing these technologies as well. One of these technologies involves sensors; i.e., devices which measure either qualitatively or quantitatively some attribute of their environment. Examples of such devices are temperature sensors, motion sensors, magnetic-field detectors, radiation detectors, pressure sensors, and chemical sensors, to name a few. Miniaturizing their functions has made them not only smaller, so that they can be used in situations previously not thought possible, but has in many cases made them better able to perform their intended tasks as well.

As miniaturization of mechanical and electrical systems occurs, the role of physical and chemical effects and parameters have to be reappraised. Some effects, such as those due to gravity or ambient atmospheric pressure, are relegated to minor roles, or can even be disregarded entirely, while other effects become elevated in importance or, in some cases, actually become the dominating variables. This "downsizing reappraisal" is vital to successful miniaturization. In a very real manner of speaking, new worlds are entered into, in which design considerations and forces that are normally negligible in real-world applications become essential to successful utilization and application of the miniaturized technology.

Surface tension and the closely-related phenomena, wettability, are usually not comparable in effect to normal physical forces at macroscopic levels. For example, surface tension is usually ignored when determining fluid flow through a pump or tube, its effect is many orders of magnitude smaller than pressure drop caused by viscosity. That is because difference in pressure, $\Delta P$, existing between the inside of a droplet and the outside is given by the relationship $$\Delta P = 2\gamma/r$$

where $\gamma$ is surface tension and r is droplet radius. Normally, in most macroscopic applications, droplet dimensions are measured in thousands of microns. Pressure differences due to surface-tension effects are therefore inconsequential, typically measuring far less than atmospheric pressure. For comparison, pressure drops resulting from viscous flow are typically on the order-of-magnitude of tens of atmospheres. When r is on the order of microns, however, pressure differences becomes enormous, frequently surpassing hundreds of atmospheres.

BRIEF SUMMARY OF THE INVENTION

The present invention provides novel new types of microdevices which are a result of the aforementioned miniaturization revolution. These devices may function as sensors and actuators or perform work by utilizing surface tension and wettability to affect and orient internal flows of fluids and gases in microtubes or microchannels. These fluids and gases can be either continuous in their presence and thereby completely filling the microtubes, or discontinuous in nature and then only partially filling the microtubes as when droplets and/or bubbles are present. However, in all the microdevices to be presented, the basic principle of operation is the movement or shape change of a fluid droplet in tubes, channels, or voids with at least one microscopic dimension, as a result of either external or internal stimuli. This change in droplet shape will always be in a manner that results in a minimization of the surface free energy of the droplet. In addition to this, some of the devices are able to measure the movement of this droplet caused by external forces.

Some microdevices described in this present patent application respond to one or more external stimuli such as pressure, temperature, and gravity or acceleration by changes in the displacement of liquid interfaces contained within microtubes and/or microchannels having fixed or variable axial geometries as well as circular or noncircular cross-sectional profiles. Other devices respond to internal stimuli, such as a change in surface tension of the liquid droplet or a change in the wettability of the microdevice's internal walls.

As was stated above the basic operating principle of all microdevices described in this patent application is the movement or change in shape of a fluid droplet based on surface tension and wettability. The cavity which constrains this droplet can be sealed or have one or more openings. It is the shape of this cavity that determines the reaction of the droplet to a stimulus as well as the use of the microdevice and the output that can be obtained from it. Uses for these microdevices are as diverse as sensors, detectors, actuators, pumps and engines.

Because these microdevices have no moving mechanical parts, they are very reliable, are able to be used in both static as well as dynamic applications, and are very rugged. That is, they can experience pressures or forces far beyond their normal operating range and still return back to their original accuracy and precision. In addition, unlike technology built up on a silicon wafer, these microdevices can be made from practically any material. Thus with the proper choice of device and droplet material, high temperature microdevices can be fabricated.

A microtube pressure sensor using a non-wetting fluid is an example of the microdevices that this present patent application make possible. It demonstrates the reaction of such a device to an outside stimulus which in this example is an increase in external applied pressure. This microdevice has a microcavity having two microtubes connected thereto. The microcavity has a nonwetting droplet inside. External differential pressures cause the droplet to move in the microcavity. Although a nonwetting droplet is used herein, a wetting droplet or a droplet having a combination of properties can be used. For example, the droplet may be electrically conductive. The interior surface of the microcavity may be partially coated with a conductive material. In combination with electrical contacts and other devices, a continuity-measuring, a resistance-measuring, a capacitance-measuring, an inductance-measuring device or combination of these or other features may be constructed. The microtube pressure sensors may be connected in parallel, series, or a combination of these to provide a unique measuring device. Further, the pressure sensor may be connected to fiber optic cables in order to provide a microdevice for the on/off transmission of radiation in response to external forces. Further, a multiple of surface position detectors can be used to monitor the movement of a droplet in reaction to external or internal forces. Other complex microdevices that can be constructed from this technology include shutters and engines.

Therefore, one object of the present invention is to provide a process for using a microdevice capable of operating as a micro sensor, micro accelerometer, micro actuator, micromachine, micropump, and microengine.

Another object of the present invention is to provide a microdevice based on surface tension that has a sensing or actuating element that uses a droplet of liquid which can be wetting, partially wetting, or non-wetting.

Another object of the present invention is to provide a process of using a microdevice for sensing external conditions such as pressure and controlling an external output based on these conditions.

Another object of the present invention is to provide a process of using a microdevice for sensing internal conditions such as pressure and controlling an external output based on these conditions.

Another object of the present invention is to provide a process for using a microdevice capable of both static as well as dynamic applications.

Another object of the present invention is to provide a process for using a microdevice capable of operating at high temperature.

Another object of the present invention is to provide a process for using a microdevice using the internal flow of liquids and gases in circular microtubes or microchannels with variable axial geometries, as well as in microtubes and microchannels having noncircular cross-sections and variable axial geometries.

Another object of the present invention is to provide a process of using a microdevice capable of withstanding tremendous over-ranging of their sensing capabilities and, thus, be able to withstand forces and pressures that are orders of magnitude greater than called for in their designed range specifications and still return back to their original accuracy and precision when these tremendous excess forces or pressures have abated.

Another object of the present invention is to provide a process of using a microdevice capable of operating with no moving solid mechanical parts, so that the ability to withstand tremendous over-forces is virtually automatically guaranteed in such microdevices.

These and many other objects and advantages of the present invention will be ready apparent to one skilled in the pertinent art from the following detailed description of a preferred embodiment of the invention and the related drawings.

BRIEF DESCRIPTION OF THE SEVERAL VIEWS OF THE DRAWINGS

FIGS. 19A to 19B illustrate different z-direction modes of the vibration sensing microdevice of FIG. 17.

FIGS. 20A to 20B illustrate the movement of a nonwetting droplet in a square microchannel.

DETAILED DESCRIPTION OF THE INVENTION

Figure 1A:
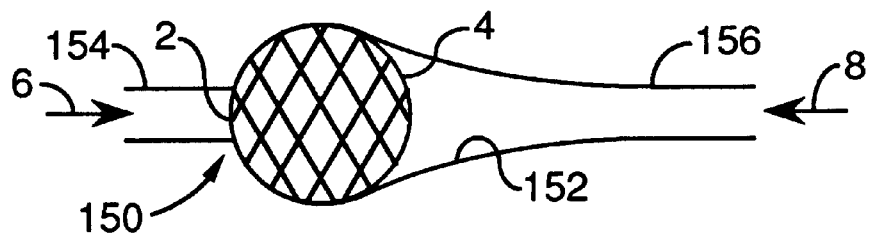
FIGS. 1A to 1C illustrate the movement of a droplet in a microcavity having two microtubes attached thereon.
Figure 1B:
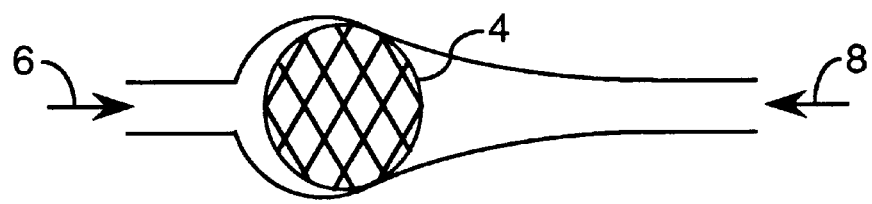
Figure 1C:
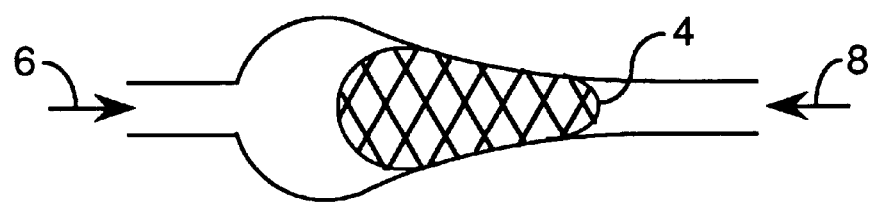

Some of the microdevices described in this present patent application respond to one or more external stimuli such as pressure, temperature, and gravity or acceleration by changes in the displacement of liquid interfaces contained within microtubes and/or microchannels having variable axial geometries as well as circular or noncircular cross-sectional profiles. The liquid interfaces in other microdevices to be described respond to a fluid movement or internal stimuli such as a change in surface tension of the droplet or a change in wettability of the interior walls of the microdevice. FIG. 1 illustrates a microtube pressure sensor 150 using a non-wetting fluid in the form of a droplet 2, an example of one of the simplest such microdevice possible. Figure 1A illustrates the position of the droplet 2 when the entrance pressure, $P_{ent}$ 6, is equal to the device pressure, $P_{dev}$ 8. FIG. 1B illustrates the position of the droplet 2 when the entrance pressure is greater than the device pressure, $P_{dev}$ 8. FIG. 1C illustrates the position of the droplet 2 when there is a much higher entrance pressure. This sensor 150 demonstrates the reaction of such a device to an outside stimulus which in this case is an increase in external applied pressure, $P_{ent}$ 6. As can easily been seen, the shape of the non-wetting droplet 2 changes in reaction to increases in applied external pressure, $P_{ent}$ 6. More precisely, increasing the external pressure, $P_{ent}$ 6, acting through an entrance microtube 154, squeezes the droplet 2 into ever-smaller-diameter locations within a microcavity 152, which results in displacement of the non-wetting interface 4 towards the smaller-diameter end of the device. The microcavity 152 may have an axially variable geometry and may be made in a process disclosed by U.S. patent application Ser. No. 08/472,574, now abandoned, being a C.I.P patent application from 08/229,962. For this type of sensor this microcavity 152 may be tear drop shaped, circular shaped, or have practically any shape as long as there is a change in at least one dimension and this dimension is between 0.003 and 1000 microns. For purposes of simplicity, the pressure on the smaller side of the microdevice, $P_{dev}$ 8, which opposes the external pressure, $P_{ent}$ 6, is set at zero in this figure. $P_{dev}$ 8 is perhaps most easily thought of as a residual gas pressure left over inside the device from the actual fabrication process. It does not have to be zero as will be shown later. The only real requirement for this type of sensor 150 is that $P_{dev}$ 8 be less than $P_{ent}$ 6, and that both pressures be smaller than the bursting strength of the microtube pressure sensor itself. It should be apparent from FIG. 1 that an over-pressure of the device will push the droplet further into the device tube 156 than was designed, but when the pressure is released, the droplet will return to its equilibrium position. As long as the walls of the device have not been damaged and maintain their original shape, the sensitivity and accuracy of this device and the others that will be described below will be unaffected by the over-pressure event.

Figure 2:
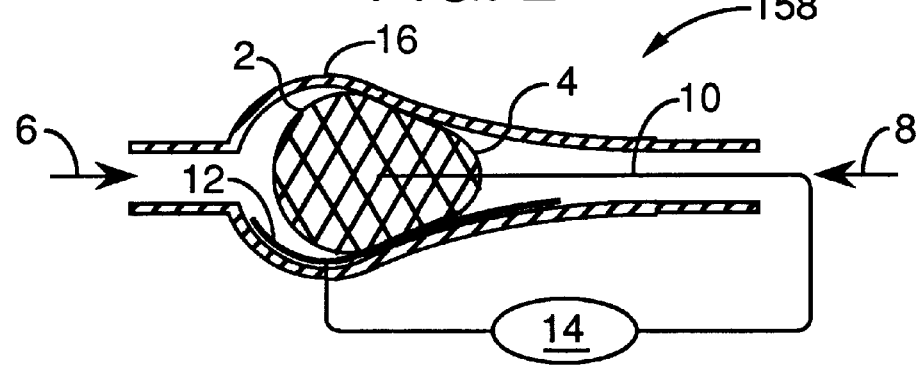
FIG. 2 illustrates a pressure sensor using a resistance measuring device.

While the reaction of the droplet 2 to external pressure is easily calculable from surface-tension theory (the change in radius of the smaller-end of the droplet is inversely proportional to external applied pressure) the actual decrease in radius and resulting displacement of the non-wetting interface 4 can only either be understood intuitively or observed visually with a microscope, as presented in FIG. 1. FIG. 2 illustrates a modification to this microtube pressure sensor based on surface-tension/wettability which enables non-visual determination of the displaced interface. This non-visual response to the reaction (movement or shape change) of the droplet interface caused by a stimuli can take many forms. One of these is a change in electrical resistance. A center contact 10 which has a measurable electrical resistance is inserted through the microtube device 158 establishing electrical contact with the non-wetting droplet 2. This center contact 10 can be a wire, tube, tape or any other elongated geometry desired. A second or side contact 12 is likewise placed in such a position so as to also make electrical contact with the droplet 2, but not make direct contact with the center contact 10. These two contacts are then connected to an apparatus 14 which measures resistance. If the non-wetting droplet material composition has been selected in such a fashion so as to be electrically conductive as well as non-wetting, any displacement of the non-wetting interface 4 which reduces the length of the center contact not touching the droplet thereby results in a reduction of the center contact's resistance as measured by the resistance measuring apparatus 14. To maximize this effect, the center contact 10 should have a very high resistance per unit length compared to the side contact 12, the actual droplet itself, as well as compared to the remainder of the circuit connecting both contacts to the resistance measuring apparatus 14.

Instead of letting only the center contact 10 in FIG. 2 be the primary means of detecting movement of the non-wetting interface 4, the side contact 12 can also serve a similar purpose, either by itself, or in conjunction with the center contact 10. Moreover, the side contact 12 can have any geometry desired. It could be a wire, tube, tape or any other elongated geometry, or even a coating on the inside of the microdevice. As long as it does not make contact with the center contact 10 in such a way as to bypass the non-wetting droplet entirely, it can be any type of contact, or even some combination thereof. The side contact 12, whatever its configuration, can also be connected to the external resistance-measuring apparatus 14 in any manner desired, as long as it does not make contact with the center contact 10. It can be connected through the microdevice walls 16, as shown in FIG. 2, or through any openings, such as where external pressure 154 is applied.

It should be noted here as well as though out this patent application that the devices shown schematically can measure a variety of external or internal stimuli. That is, the pressure sensor 158 in FIG. 2, for example, could also measure acceleration and oscillation along the device axis as well as rotation and temperature, which affects both the thermal expansion and the surface tension of the droplet. In fact, if another center contact is also placed in the device on the end opposite the present center contact, the device can measure acceleration in two directions. In addition, it should be apparent that to measure parameters such as temperature, rotation, acceleration or oscillation it is not even necessary to have the entrance tube 154 and the device tube 156 open to the atmosphere. Thus, to measure these external stimuli or some internal stimuli, a totally sealed cavity would function as well as the open pressure sensor 158 in FIG. 2.

For purposes of simplicity only pressure sensors will be shown schematically and it should be understood that the devices work equally well in reaction to many other stimuli. A partial list, which includes: vibration, acceleration, rotation, temperature, electromagnetic fields, and ionizing radiation, demonstrates the broad scope of this sensor technology.

As stated previously the opposing pressure, $P_{dev}$ 8, need not be zero. It has been set at zero thus far for simplicity. For this type of sensor it merely needs to be less than the externally applied pressure $P_{ent}$ 6, otherwise the non-wetting droplet 2 could be expelled from the microtube pressure sensor. For a perfectly round drop of any liquid material with radius r and surface tension γ, one can calculate the internal pressure of the droplet, $P_{int}$, using Laplace's Equation for spherical geometry:

$$P_{int}=2\gamma/r \qquad 1$$

This internal pressure, or confining force, can be thought of as being caused by a surface "skin", similar to a balloon holding in air. Instead of a thin membrane of rubber as in the case of balloons, however, confining forces in surface tension are caused by the affinity of molecules of droplet material for one another. On the surface of a drop, because molecules are missing a binding partner looking outward, they pull on their nearest neighbors, not unlike magnets drawing one another together.

If the droplet is not perfectly round, a slightly more complex equation must be used. This more general form of equation 1 is shown in equation 2.

$$P_{int}=\gamma/(1/r_1+1/r_2) \qquad 2$$

Here $r_1$ and $r_2$ are the two different radii of the non-spherical droplet. This equation is needed to determine the internal pressure of a non-spherical droplet in an oval or other non-circular microdevice cross-section. Obviously, equation 2 reduces to equation 1 if the two radii are equal. For simplicity, only spherical droplets will be considered in the examples that follow. However, it should be understood that non-spherical droplets can also be used in place of the spherical droplets illustrated.

Figure 3A:
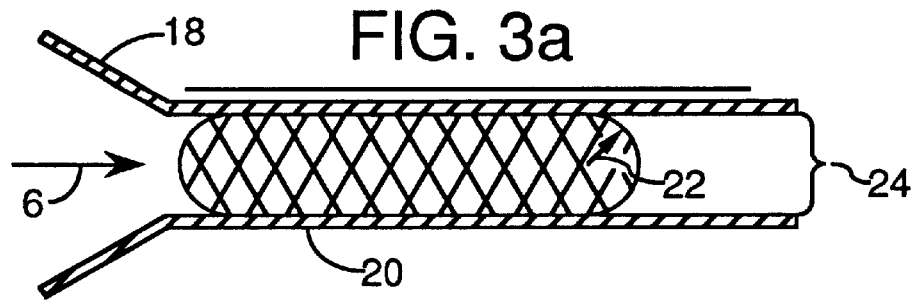
FIGS. 3A to 3C illustrate a nonwetting droplet in a straight tube, a wetting droplet in a straight tube, and a droplet being a combination of nonwetting/wetting in a straight tube.

If, now, the droplet is forced through an entrance funnel 18, FIG. 3A, into a smaller-radius microdevice tube 20 by external pressure, $P_{ent}$ 6, as shown in FIG. 3A, the drop will become elongated in order to squeeze into the tube. The radius of the non-wetting droplet, $r_{dev}$ 22 will now be the same as the radius of the microdevice tube $r_{tube}$, which is one half of $d_{tube}$ 24. The external pressure, $P_{ent}$ 6 needed to force the non-wetting droplet into the smaller-radius microdevice tube 20 is, again, given by Laplace's Equation but now with the radius of the tube used in the denominator:

$$P_{ent}=2\gamma/r_{dev} \qquad 3$$

Figure 3B:
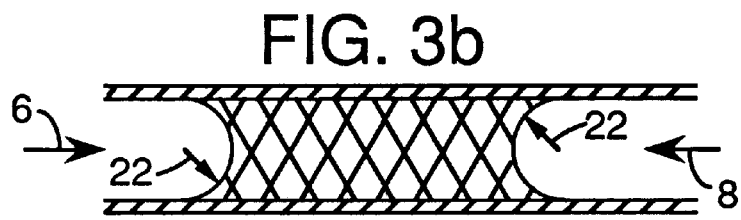
Figure 3C:
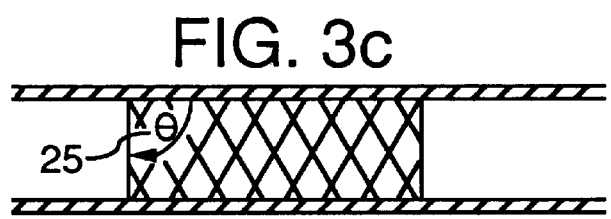

In contrast to the non-wetting droplets discussed thus far, FIG. 3B illustrates the appearance of a totally wetting droplet in a straight tube. Now, the appearance of the ends of the droplet is reversed from FIG. 3A. That is, because the walls of the tube are now wetted by the droplet, they are not repelled by the droplet as with non-wetting behavior, but are instead treated much like other molecules of the droplet; i.e., the walls and the molecules in the droplet attract one another similar to magnets. In FIG. 3C, a droplet is illustrated which has wettability behavior exactly half-way between totally wetting and totally nonwetting. The contact angle θ 25, which is 90° in this figure, is the accepted mathematical technique to quantify wetting behavior. When its value is 180 degrees, the fluid is totally nonwetting, and when it is zero degrees, the fluid is totally wetting. All real fluids are somewhere in between these two extremes. For the purposes of this patent application, we will use the term non-wetting to refer to a contact angle greater than 90° and the term wetting to mean a contact angle less than 90°.

It is important to realize that surface tension and wettability are closely related phenomena. Surface tension, however, only involves the strength of attraction of droplet molecules for one another, whereas wettability in this example includes the strength of attraction of droplet molecules with molecules of the wall material.

When a wetting droplet is employed in place of a non-wetting droplet, instead of needing $P_{ent}$ 6 to reach some value given by equation 2 in order to force the droplet into the microtube, it goes in automatically. This behavior is often referred to as "wicking." In contrast to the non-wetting droplet situation, no pressure is needed to get the drop into the tube, but a pressure identical to that needed to force the non-wetting droplet in, but which acts in the reverse direction, is needed to force the wetting droplet out of the tube. This would be provided by $P_{dev}$ 8. The fact that wetting droplets behave similarly to non-wetting droplets in some respects means that microdevice sensors can employ either wetting or non-wetting fluids as the droplet material, and still serve the same function. In the case of microtube pressure sensors, this would require modifying which side of the droplet actually "feels" the applied pressure. Microdevices sensing other stimuli would also need similar kinds of modification. These would be specific to the actual sensing application. It is interesting to note that in FIG. 3C, no pressure at all is required to either force the droplet into the straight tube or to remove it.

Figure 4A:
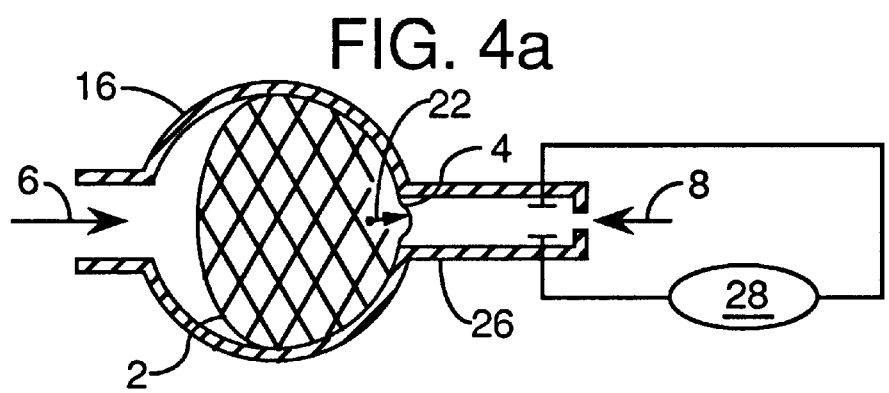
FIGS. 4A to 4B illustrate microdevice with a straight port that functions as a no/yes indicator.
Figure 4B:
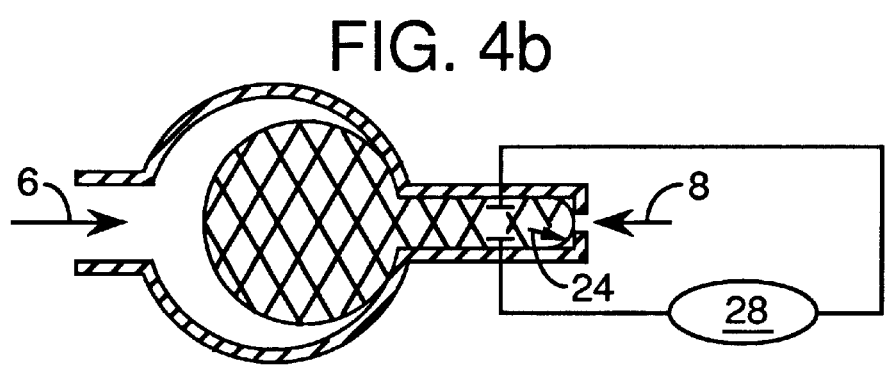

FIGS. 4A and 4B illustrate the relationship between the radius of curvature of the small end of the drop $r_{dev}$ 22 and the various pressures involved for a microtube pressure sensor which has a digital type of response, which will hereafter be referred to as a "Yes-No" response. In FIG. 4A, the applied pressure $P_{ent}$ 6 is not sufficient, compared to $P_{dev}$ 8, to force the non-wetting droplet 2 into the straight port 26. The continuity apparatus 28 therefore registers an open circuit, or "No" response. In FIG. 4B, the applied pressure, $P_{ent}$ 6, is sufficient to force entry of the non-wetting droplet 2 into the straight port 26. Once the droplet has entered the straight port 26, it completely fills it and the continuity apparatus 28 registers a closed circuit, or "Yes" response. As mentioned previously, this same kind of "Yes-No" response can be duplicated using wetting fluids. However, since a wetting fluid would spontaneously wick into the smaller diameter tube, the only difference would be that now an applied pressure of sufficient magnitude would need to be directed to $P_{dev}$ 8 in order to expel the wetting droplet from that same straight tube 26. For a wetting fluid the continuity apparatus 28 would therefore work in reverse to the "Yes-No" response for a non-wetting droplet. In this case, $P_{dev}$ 8 must be greater than $P_{ent}$ 6 and therefore an open circuit signifies "Yes" and a closed circuit signifies "No." However, because a wetting droplet adheres to the microdevice walls 16, including the straight port 26, fluid remaining on these surfaces might compromise the accuracy of the continuity apparatus. It is therefore preferable to use non-wetting droplets in this kind of sensor. This same logic applies to most microdevices based on surface tension and wettability, and so in the discussion that follows only non-wetting behavior will be illustrated. This is done so purely for convenience and it should be understood that wetting droplets can be used practically interchangeably with the non-wetting droplets in any device shown below.

Figure 5A:
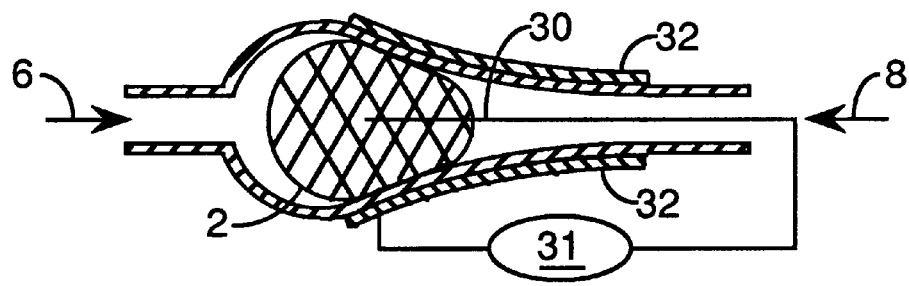
FIGS. 5A to 5B illustrates a microdevice with a capacitance output.
Figure 5B:
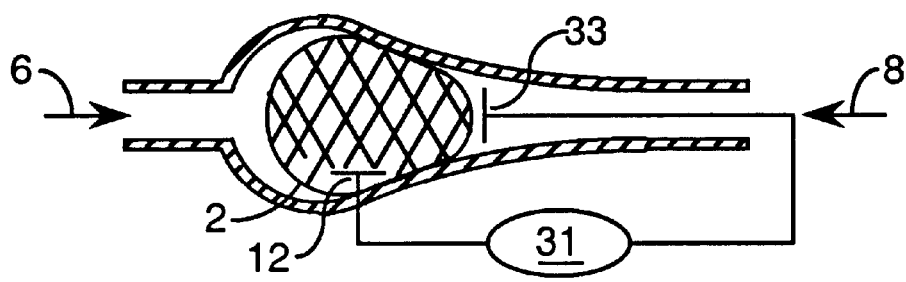
Figure 6:
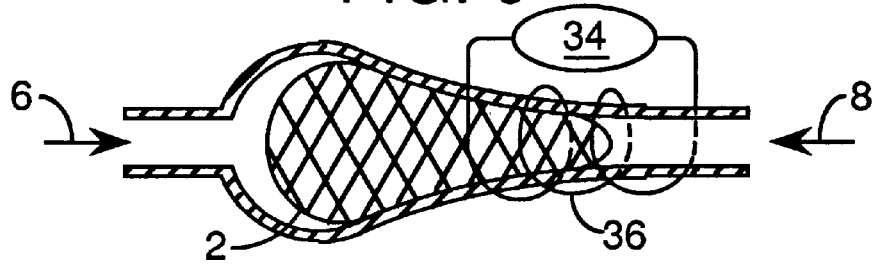
FIG. 6 illustrates a microdevice with an inductance output.

There are obviously many other means to measure displacement of the non-wetting droplet. Other basic electrical parameters which can be employed are capacitance and inductance. FIGS. 5 and 6 illustrate microdevice pressure sensors employing surface phenomenon and using first capacitance and then inductance as the electrical technique for monitoring displacement of the non-wetting droplet. In FIG. 5A, a conductive coating 32 or contact is applied to the outside of the microdevice wall 16, which is electrically insulating in this design, in order to form an outer capacitor plate 32 thereby producing a capacitor in conjunction with the non-wetting droplet 2. More than one capacitor plate could be employed and they could be continuous coatings, tapes, or wires, or any other form. As the non-wetting droplet's displacement changes in reaction to variations in the difference between the entrance pressure $P_{ent}$ 6 and the device pressure $P_{dev}$ 8, the capacitance changes according to well-known laws of physics. This change is measured via an external capacitance-measuring apparatus 31. As is the case in all the schematic devices presented in this application, there are many possible variations on the theme. One such variation of the sensor shown in FIG. 5A is given in FIG. 5B. Here the center contact 30 has been replaced with a capacitance probe 33 which takes the place of the outer capacitor plate 32 in FIG. 5A. Obviously, this equivalent way of measuring the capacitance with a different plate geometry in FIG. 5B does not change the basic thrust of this application which is that a droplet is able to move in a microdevice under the influence of a stimulus and its position can be accurately ascertained.

In FIG. 6, a coil 36 is wound around the microdevice wall and connected to an external inductance-measuring apparatus 34. Now, displacement of the non-wetting droplet 2 affects a change in the inductance of the coil, which is then measured by an external inductance-measuring apparatus 34. It should be noted here that with all the aforementioned techniques for measuring displacement of the non-wetting droplet using electrical means, the electrical properties of the non-wetting droplet must, of course, be suitable for the measurement technique employed. For some applications, the resistance of the non-wetting droplet must be sufficiently low to permit resistivity measurements of the center contact to be made accurately enough for the application at hand. For other applications the conductivity must be high enough to enable capacitance to be accurately measured. For certain applications, permeability must be sufficiently different between the non-wetting droplet and its surrounding medium in the microdevice to allow inductance to be measured accurately enough to satisfy demands of the desired application. These electrical properties requirements will most likely be different depending on the measuring technique employed and the particular application being developed.

Figure 7:
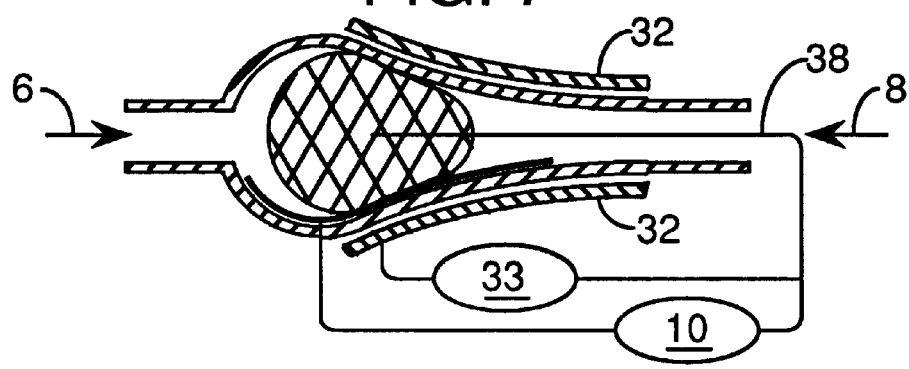
FIG. 7 illustrates a microdevice with a resistance/capacitance output.

It is also possible to combine two or more readout techniques in a single device. One such combination is illustrated in FIG. 7 for a microdevice pressure-sensor having both capacitance and resistance remote readout capabilities. The shared center contact 38 in this microdevice serves both as a center resistance contact 10 in FIG. 2, and the center contact 30 in FIG. 5.

Figure 8:
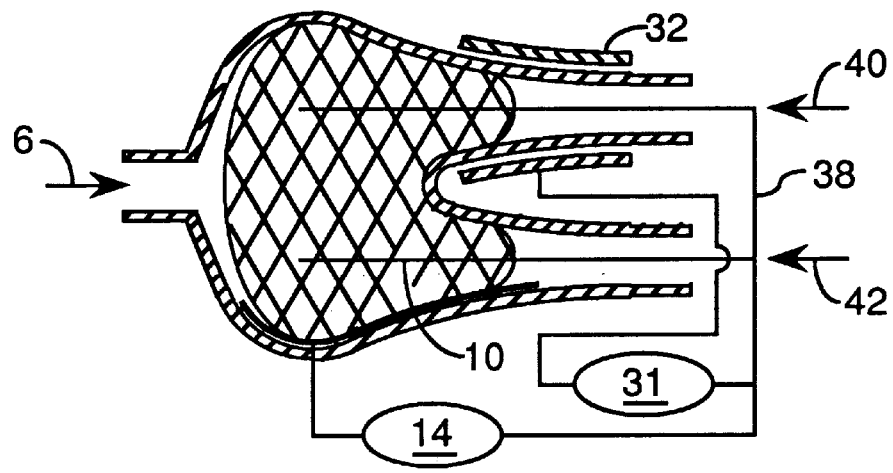
FIG. 8 illustrates a microdevice with a combination resistance/capacitance-measuring dual-output.

Another method of achieving readout redundancy is illustrated in FIG. 8. Now, however, the microdevice pressure-sensor has been modified so that each readout technique employed has its own independent non-wetting-droplet surface-displacement to measure. In this example, these are referred to as the upper channel 40 and lower channel 42, respectively. Note that even though the droplet in each channel has its own rounded surface, they will each have the exact same radius given by equation 2, provided that the device pressure in each channel is the same. If the pressure in each channel is not the same, the radii will be different, but will still governed by the relationship given in Equation 2. This means that if in this particular example the two channels are not identically tapered, the displacement of the non-wetting droplet in each channel will be different. That is, under identical applied pressures each droplet will move into its own tapered channel until it has the same radius as determined by Equation 2. Thus, if the tapers of the two channels are not equal, the droplets will move different distances into the channels and the two sensing channels will therefore have different sensitivities, in terms of displacements of the separate but equal-radii non-wetting surfaces, to a given change in entrance pressure, $P_{ent}$ 6. Whether this is wanted or not is entirely up to the discretion of the microdevice fabricator. It is also up to the discretion of the microdevice fabricator as to exactly what kind of readout device, or combination of devices, to employ for a specific application. For example, they can all be identical readout techniques, each with a different sensitivity in terms of non-wetting-droplet surface-displacement in reaction to outside stimulus change, such as external pressure variation, $P_{ent}$ 6. This would be a multi-range sensor. Alternatively, they can be more-or-less identical both in terms of the kind of sensing technique employed on each channel as well as the sensitivity of each channel. Their presence in multiple numbers could simply be designed into the microdevice for redundancy which lessens the chance of readout malfunction completely crippling the microdevice.

Figure 9A:
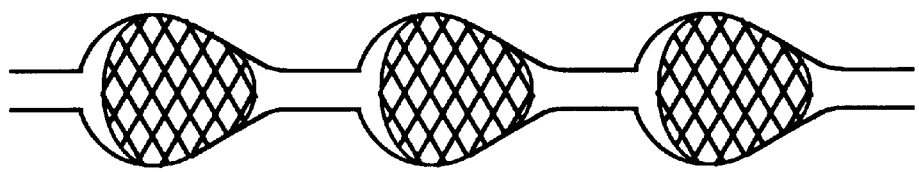
FIGS. 9A to 9B illustrate a series arrangement of microdevices and a parallel arrangement of microdevices.
Figure 9B:
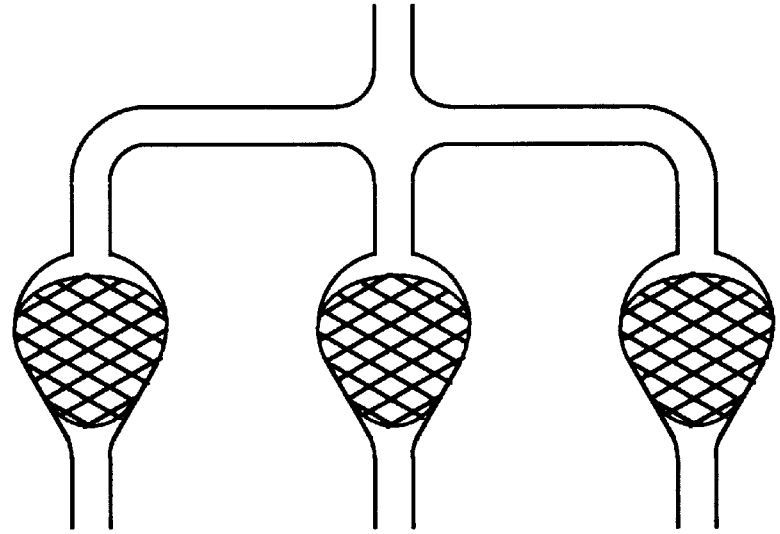

Multiple numbers of devices can be connected in series or in parallel by manifolds as shown in FIGS. 9A and 9B. If one examines FIG. 8 again in light of FIG. 9B, it should be apparent that it is a special type of parallel sensor in which the sensors are not totally discrete because they share a common input tube.

For either multi-range or redundancy-driven applications, there is a great deal of variation possible. These variations are in the form of identical or different device, cavity, and/or channel or tube configurations as well as identical or different types of readout. It should be mentioned that many different types of device channel or tube 156 configurations are possible that will give either linear or non-linear responses as well as analog or digital responses to the stimuli being sensed. For example, a gradual taper would produce a linear response while a very rapid taper would give a non-linear response. In another example, a device such as shown in FIG. 4 could be modified with a tapered section to follow the constant dimension tube. This would result in a digital response followed by an analog response. In addition to these differences in individual sensors, multiple sensors could all be used together at the same time, or switched on or off as needed.

Figure 10:
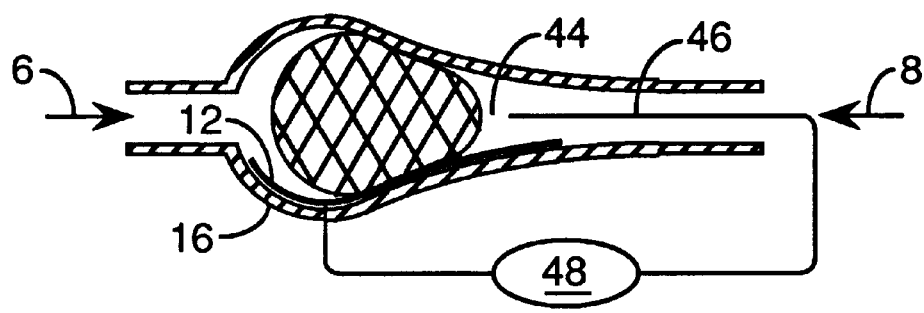
FIG. 10 illustrates coarse continuity-measuring microdevice.

As mentioned previously, the presence or absence of non-wetting material in a straight tube, FIG. 4, enables the pressure sensor, or other microdevice deriving its capabilities from surface properties of materials, to function in a digital or a "Yes-No" mode of response. FIG. 10 illustrates another very simple kind of "Yes-No" readout response for a pressure sensor that does not have a straight tube. The center contact 30 in FIG. 5 has now been truncated so that it does not make contact with the non-wetting droplet for low values of pressure difference between $P_{ent}$ 6 and $P_{dev}$ 8. This lack of contact, or gap 44, is shown in FIG. 10. The truncated center contact 46 only makes contact with the non-wetting droplet once a predetermined pressure difference exists ($P_{ent}$ 6 greater than $P_{dev}$ 8). Once this occurs, the continuity meter signals contact has been made providing the desired "Yes-No" readout response. Once sufficient pressure difference has been established, the truncated center contact 46 can then function as a center resistance contact 10, center contact 30, some other kind of readout implement, or some combination thereof. The truncated center contact 46 should not move relative to the microdevice walls 16 in this simple form of "Yes-No" readout microdevice. It should be apparent that devices of this type with a truncated center contact 46 can also serve as an electrical switch based on surface tension and wettability that can be made to operate independent of gravity, be impervious to radiation, and can be activated by numerous stimuli.

Figure 11:
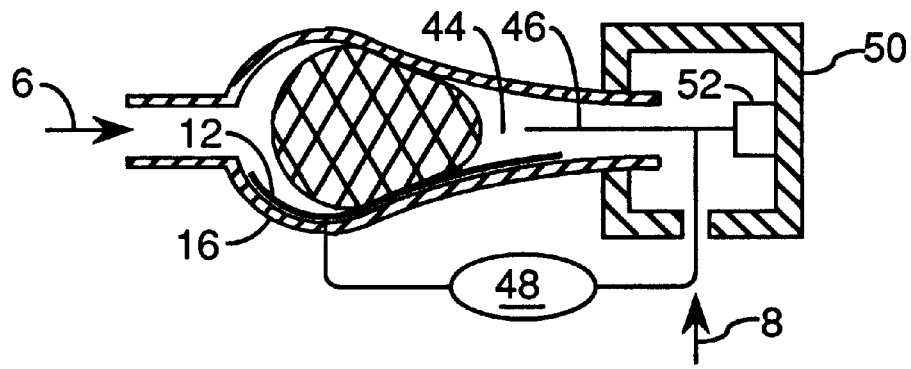
FIG. 11 illustrates a precise adjustable continuity-measuring microdevice.

A more sophisticated "Yes-No" readout microdevice pressure sensor is illustrated in FIG. 11. Now the truncated center contact 46 is attached to a positioner 52 which, in turn, is attached to a positioner holder 50 which is itself held firmly in place relative to the actual microdevice walls 16. In FIG. 11, the positioner holder 50 is shown attached to the microdevice walls 16. The positioner is any type of device capable of moving the truncated center contact 46 relative to the microdevice walls 16 in a predetermined fashion. Examples of such positioning devices are numerous. They can be of the type where the operator sets the gap and thereby controls the devices' sensitivity, such as pressurized microbellows and piezoelectric crystals. Alternatively, the positioning device can be of the type which is influenced by its environment, such as those made from a photostrictive, chemostrictive, electrostrictive, or magnetostrictive materials, which change length due to light, in a chemical environment, or in an electric or magnetic field. With theses types of materials, the positioner can be controlled in real time by its environment, and thus the device is able to respond to two stimuli simultaneously. Moreover, with any such positioning devices, the gap can be changed by a feedback circuit. By altering the size of the gap 44 either before or during actual operation of the microdevice, the amount of pressure difference needed between $P_{ent}$ 6 and $P_{dev}$ 8 to establish contact and thereby evoke the "Yes-No" readout response or continuity as measured by the continuity apparatus 48, can be changed. Thus, the sensitivity of this device can be changed by an operator, by its environment, or a feedback circuit. As before, with the simple "Yes-No" readout response microdevice of FIG. 10, once continuity has been established, the truncated center contact 46 can be used for other kinds of readout purposes. For example, the continuity apparatus 48 can be modified to function as the resistance-measuring apparatus 14 shown in FIG. 2. If this is done, both digital and analog readout responses can be garnered from the same sensor. Also, more than one center contact 46 of different lengths and/or more than one side contact 12 can be employed in FIG. 10, thereby providing multiple digital responses from one device.

Figure 12:
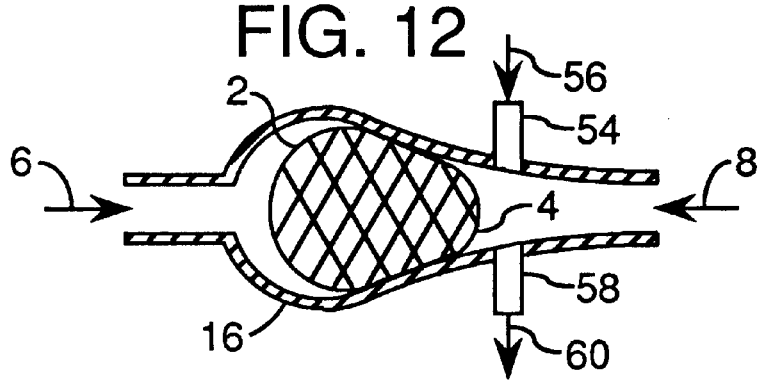
FIG. 12 illustrates a first signal/no signal radiation microdevice.
Figure 13:
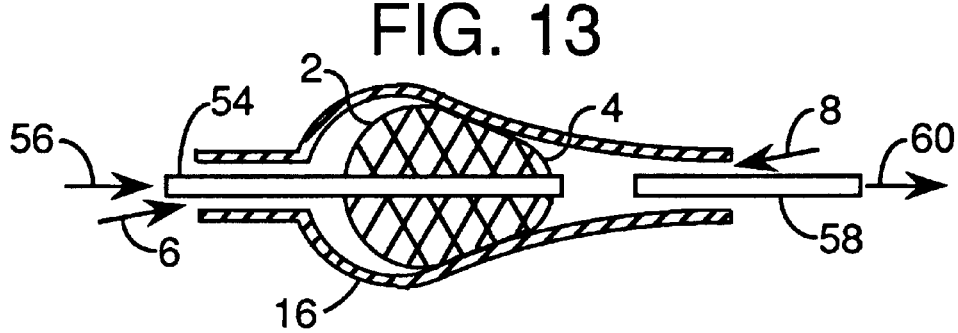
FIG. 13 illustrates a second signal/no signal radiation microdevice.

Another category of "Yes-No" readout techniques is illustrated in FIGS. 12 and 13. This time actual contact is not made, but rather the transmission or non-transmission of a signal between two points within the microdevice establishes the presence or non-presence of the droplet interface. This signal can be in the form of electromagnetic radiation or a particle beam. In FIG. 12, the signal is in the form of electromagnetic radiation in 56 entering through the microdevice walls 16 via a device such as a fiber-optics input cable or lightguide 54 and exiting or not exiting as radiation out 60 via a fiber-optics output cable or lightguide 58. The direction of travel of the electromagnetic radiation is perpendicular to the direction of motion of the non-wetting droplet internal interface 4 in this figure, although this is not absolutely necessary. In fact, in FIG. 13, the direction of travel of the electromagnetic radiation is now parallel to the direction of motion of the non-wetting droplet internal interface 4. If the diameter of the optical input and output devices, 54 and 58 respectively, is small relative to the dimensions of the non-wetting droplets 2, and the non-wetting droplets 2 are opaque to the electromagnetic.

radiation, a "Yes-No" type of readout response will occur in both FIGS. 12 and 13. If either condition is not met, the readout response will occur more-or-less gradually, depending upon the actual physical parameters involved. This more-or-less gradual response is similar to the previously described readout response typical when electrical parameters are employed.

It should be noted at this point that the techniques mentioned thus far have all been relatively simple in that they have employed principles of physics that are intuitively easy to understand; i.e., changes in resistance, capacitance, or inductance; or the presence or non-presence of an electromagnetic signal. Two other techniques which can also be employed to monitor displacement of the non-wetting droplet interface are optical interference and electron tunneling. They are also capable of much higher levels of resolution of the non-wetting droplets' displacement which results in greater levels of sensitivity.

Figure 14:
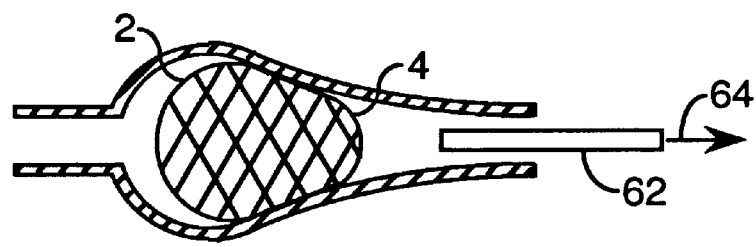
FIG. 14 illustrates a precise position measuring radiation microdevice.

FIG. 14 illustrates the readout technique which employs optical interference. The primary difference between this readout technique and the previous technique which employs a fiber optic cable or lightguide (FIG. 13) is that the fiber-optics input cable 54 is removed entirely. Also, the fiber-optics output cable 58 is renamed the "fiber-optics input/output cable 62," and radiation out 60 is renamed "radiation in/out 64." The only additional requirement that must be imposed in order to use this technique is that the non-wetting droplet needs to be able to reflect at least some of the electromagnetic radiation input through the fiber-optics input/output cable 62 back out through the same cable. If these conditions are met, an interference pattern can then be generated between the incoming and outgoing rays of radiation 64 that can be detected by a suitable apparatus located at the opposite end of the fiber-optics input/output cable 62. This interference pattern will be highly dependent on the position of the internal interface 4 of the non-wetting droplet 2, as well as on the wavelength of radiation employed. It is therefore an extremely accurate technique for monitoring any displacement of that interface.

Figure 15:
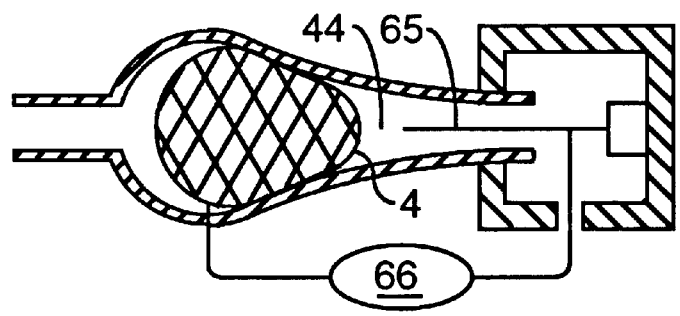
FIG. 15 illustrates a precise scanning probe microdevice.

FIG. 15 illustrates the readout technique for electron tunneling. The primary difference between this readout technique and the previous readout technique employing a truncated center contact 46 illustrated in FIG. 11, is that in this apparatus the truncated center contact 46 is replaced with a very sharp needle-shaped electrode 65, and the continuity apparatus 48 is replaced with a much more sensitive electron tunneling-current detector 66 which can measure the tiny electrical currents generated when the needle-shaped electrode 65 moves very close to the internal interface 4 creating gaps 44 on the order of atomic dimensions. As with optical interference, tunneling current measurements are many times more sensitive to displacements of the internal interface 4 than simpler readout techniques discussed initially. Obviously, any other detecting technique used in scanning probe microscopy, such as atomic force, magnetic force, capacitance, etc. can be used in place of the needle-shaped electrode 65 and the current-detection circuit. In addition the sensitivity of these devices, as with the device in FIG. 11, can be changed by varying the gap 44 between the tip and the droplet.

Figure 16:
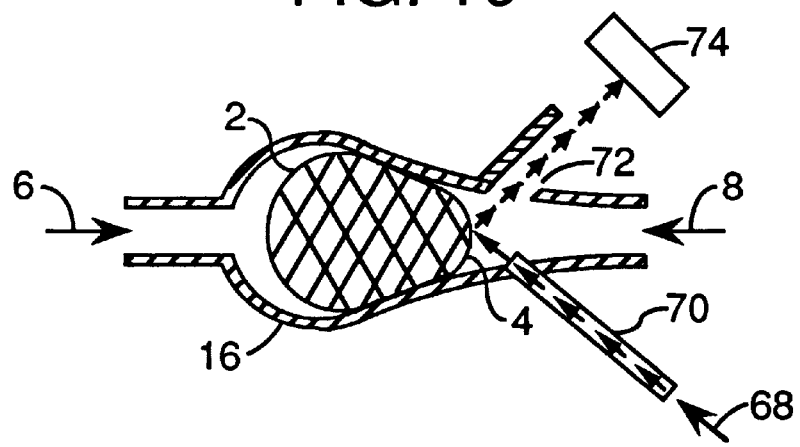
FIG. 16 illustrates a radiation reflection microdevice.

At this point, it is well worth mentioning again that it is the movement of a droplet in a microscopic tube, channel, or void and the process of remote measurement of displacements of the internal interface 4 itself that is of critical significance to many devices in this patent, not the actual kind of remote measurement technique employed. Whatever technique is employed affects only the accuracy of remote readout. Thus, regardless of the measurement technique displacements of the internal interface 4 in reaction to external stimulus will be the same, depending only on surface tension and wettability of the sensor components, and on sensor geometry. FIG. 16 illustrates this critical difference. In this figure, a microtube pressure sensor has been outfitted with a beam input device 70. This could be a fiber optics cable or lightguide to input optical radiation, or a simple tube to admit a collimated beam of particles such as electrons. Once this beam 68 is inside the microdevice walls 16, it can reflect, or bounce, off the internal interface 4 and then pass through a wall passage 72. It can subsequently be detected by a suitable beam output detector 74. It is obvious from this illustration that if appropriate angles of beam input and output, and location of the beam output detector 74 are not chosen properly, no beam will be detected at all. That does not mean displacements of the internal interface 4 in reaction to changes in entrance pressure, $P_{ent}$ 6, and/or device pressure, $P_{dev}$ 8, will not occur. They most certainly will, and any such displacements will obey the relationship described by Equation 1. They simply will not be remotely read out.

Up until this point, it has been tacitly assumed that motion of the internal interface 4 during any remote readout of its displacement is negligible. This does not necessarily have to be the case. Any measurement of position of the internal interface 4 will take some finite amount of time. If there is motion of the internal interface 4 during this finite measurement time, some sort of average readout of position of the internal interface 4 will occur. If this is acceptable to the designer of the microdevice, all is well. If it is not, some change in either the method of remote readout, or the level of precision of the actual analytical instruments employed must be undertaken to increase the speed of readout to the degree required. Once this has been done, microdevices based on surface tension and wettability with remote readout capabilities can function as either static or dynamic analytical detectors or sensors.

Figure 17:
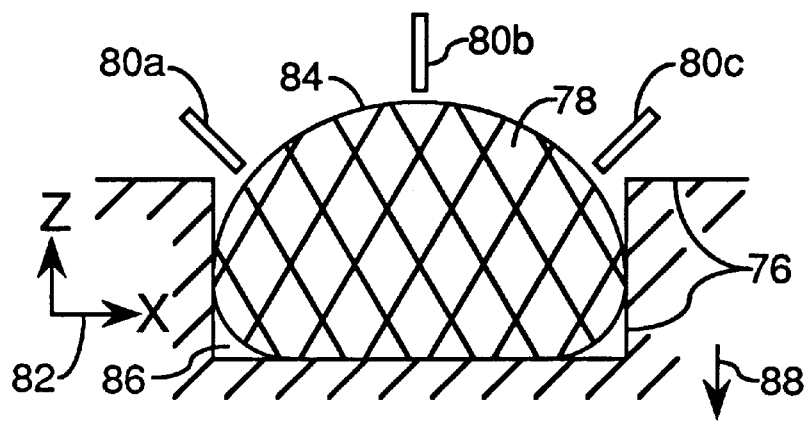
FIG. 17 illustrates a vibration sensing microdevice.
Figure 18A:
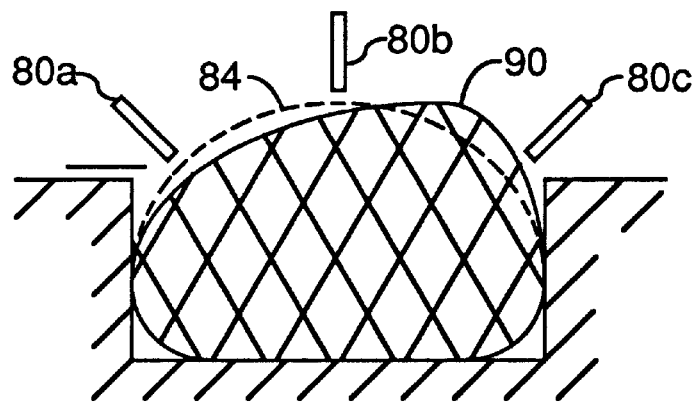
FIGS. 18A to 18B illustrate different x-direction modes of the vibration sensing microdevice of FIG. 17.
Figure 18B:
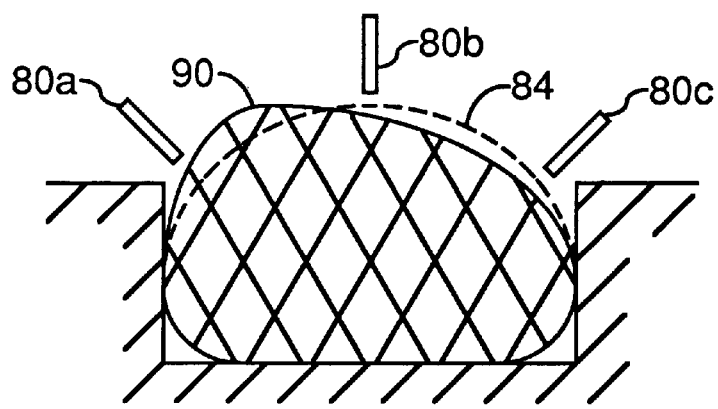
Figure 21A:
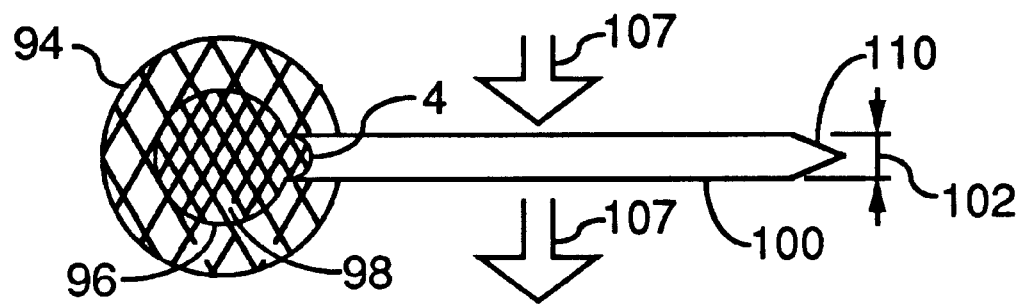
FIGS. 21A to 21D illustrate several views of a rectangular shutter microdevice.
Figure 21B:
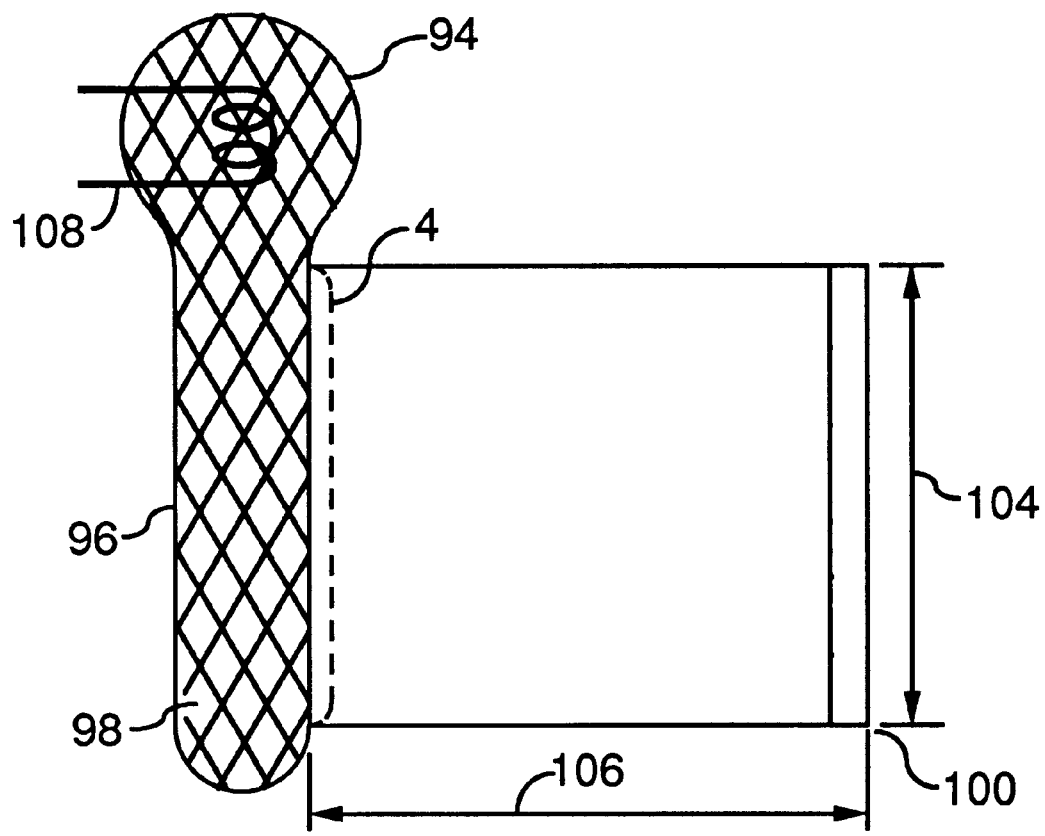
Figure 21C:
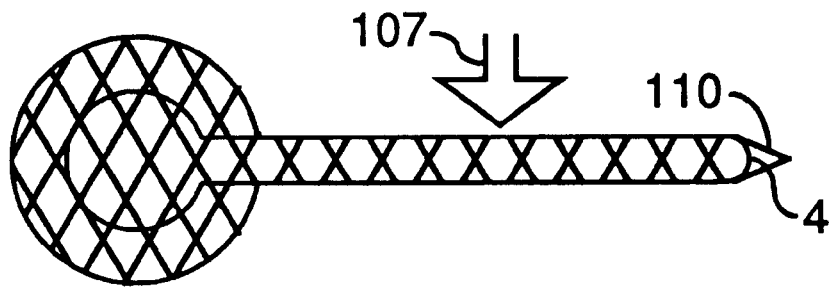
Figure 21D:
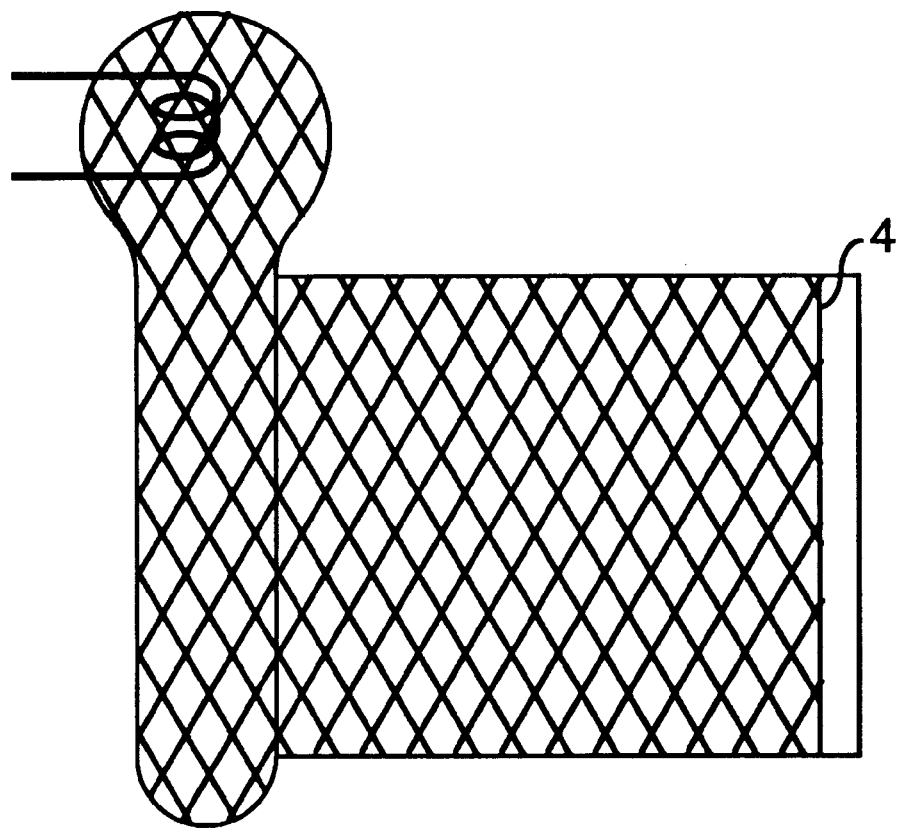

The reason dynamic readout capabilities are important is twofold. First, even static conditions usually change with time in some fashion, and so even slowly changing positions of the internal interface 4 must be considered dynamic. And second, some types of sensors never achieve static conditions at all during their periods of actual sensing. FIG. 17 illustrates a schematic two-dimensional representation of one such sensor. It is a vibration meter or accelerometer fabricated from a drop of fluid held in position by non-wetting walls. In the geometry used for this illustration, the drop is referred to as a sessile drop 78 and the non-wetting walls as the sessile drop holder 76. The word sessile is derived from a Latin word meaning "to sit," which is exactly what the drop is doing in FIG. 17. In this example, gravity 88 is holding the droplet in the holder. Surface position detectors 80 are mounted vertically at b as well as at off-center locations a and c. These detectors maintain their positions relative to the sessile drop holder 76 at all times, and can be any of the types used in previous discussions to detect the internal interface 4, or some other type of readout detector. Whenever the sessile drop 78 is subjected to linear acceleration or oscillatory motions in either the X or Z directions of motion 82, the static sessile drop surface 84 will deform as shown in FIGS. 18 and 19. The static sessile drop surface is shown dashed in both FIGS. 18 and 19. In FIG. 18A, the sessile drop holder 76 has experienced an oscillatory X-direction motion, or thrust, to the left. This deflects the static sessile drop surface 84 asymmetrically to the right in FIG. 18A. The reverse situation is illustrated in FIG. 18B. In FIG. 19A, the sessile drop holder 76 has experienced an oscillatory Z-direction motion, or thrust, downwards. This deflects the static sessile drop surface 84 symmetrically upwards in the center, and downwards at the edges. The reverse situation is presented in FIG. 19B. The extreme deflections are presented in all four figures. It is well worth noting that linear acceleration or oscillatory motion in the X-direction results in a different elevation of the deflected sessile drop surface 90 relative to each of the three surface position detectors 80; and that left deflection is easily recognized from right deflection. Moreover, Z-direction linear acceleration or vibration produces a symmetric readout from the three surface position detectors 80, and upwards versus downwards deflection is again easily recognizable. While FIGS. 17, 18, and 19 are all two-dimensional, the same logic applies in three dimensions as well. Since linear acceleration or oscillatory motion is totally dynamic, i.e., there is never a period of rest referred to as static equilibrium or constant linear velocity. The motion of the deflected sessile drop surface 90 is continuous, and therefore the surface position detectors 80 must also be dynamic in capability. It should be remarked that the shape of the drop holder in FIGS. 17–19 is not critical. For instance, a drop holder such as in FIG. 4A with the straight section removed could also be used. In this geometry, the drop would partially protrude through the hole and the center position detector 80 would be placed along the axis of the device with the other positioning devices being off-axis. It is also important to note for reasons stated below that there will always be open corners 86, FIG. 17, whenever a non-wetting droplet is constrained by a cavity whose smallest curved surface has a radius of curvature smaller than the smallest radius of curvature of the non-wetting droplet.

Up until this point, it has been tacitly assumed that the shaped or tapered microtubes or microchannels within which droplets move or flow under the influence of surface tension and wettability, and some external forcing agent such as pressure or acceleration, have been circular in cross-section. This does not have to be the case. FIGS. 20A and 20B illustrate flow of an elongated non-wetting droplet 2 constrained on four sides by walls that form a square cross-section 92. As stated above, there will always be open corners 86 in this kind of non-wetting flow situation because infinite internal pressure would be required in the non-wetting droplet the result of setting r equal to zero in the relationship given in Equation 1 in order to completely fill in all corners. This can never be true for two reasons. First, there is no such entity as infinitely-high pressure. Second, in FIGS. 20A and 20B, bypass flow of externally applied pressure $P_{ent}$ 6 will occur through all open corners 86 thereby reducing actual pressure applied to the non-wetting droplet 2. This effective pressure difference will be some fraction, $k_{eff}$, which is always less than or equal to one, multiplied times the actual pressure difference $P_{ent}$ 6 minus $P_{dev}$ 8. In actual equation form this becomes:

$$P_{eff} = k_{eff} * [P_{ent\ 6} - P_{dev\ 8}] \qquad 4$$

where "*" signifies multiplication. An analogous situation occurs when a child shoots an irregularly-shaped pea out through a circular straw. Even though gaps equivalent to the open corners 86 in FIGS. 20A and 20B exist around the pea, the child can still expel the pea from the straw simply by blowing hard enough, thereby producing a sufficiently effective pressure on the pea to accomplish the purpose. This is exactly the situation that exists for flow of non-wetting droplets in non-circular microtubes or microchannels. Therefore all previous arguments made for remote sensing of droplet interfaces in circular cross-sectioned microtubes or microchannels apply equally well to remote sensing of droplet interfaces in microtubes, microchannels, or voids having any type of non-circular profile. Moreover, non-circular microtubes or microchannels can certainly be used in conjunction with circular microtubes or microchannels in the same microdevice. In fact, there is very good reason to do so. Non-circular microtubes or microchannels can be fabricated relatively easily using techniques such as photolithography and LIGA on a surface. This is currently done on silicon wafers by a sequence of deposition and/or etching techniques in a number of different ways-two of which will be given. A non-circular channel can be formed, for example, by etching the channel in the surface and then covering the channel by sealing a glass plate over it. Alternatively, for example, the non-circular channel can be formed by etching a channel in the surface and then filling it with a sacrificial material. Another material is then deposited over the filled channel and then the sacrificial material is removed leaving a microchannel. However, no matter how the non-circular channel is formed in the surface, bypass flow of gases occurs through the open corners 86 they possess as illustrated in FIG. 20B. As just mentioned, this makes it difficult to apply pressure accurately and reproducibly to non-wetting droplets contained within such microtubes or microchannels. This is not true for circular microtubes or microchannels. Thus, the presence of small circular microtubes or microchannels at appropriate positions in any device fabricated with non-circular microtubes or microchannels will allow either gases or wetting fluids to apply hydrostatic pressure to microdevices containing non-wetting droplets with an efficiency $k_{eff}$ of unity in Equation 4. The reverse is also true. The presence of a circular cross-section in the device will also allow the non-wetting droplet to apply force to the gas or wetting fluid with an efficiency of 1. This also means it is possible to have wetting and non-wetting fluids present in the same microdevice. Finally, it should be stated that regardless of the cross-sectional shape of the microtubes, microchannels, or voids, all wetting fluids will have a $k_{eff}$ of one.

It is extremely important to realize that the previous discussion also illustrates that the elongated non-wetting droplet 2 confined within a microtube or microchannel having, for the sake of illustration, square walls 92 can serve purposes other than remote sensing. For example, it can be used to act as a shutter in optical applications, with the presence or absence of the droplet controlling whether or not light or other electromagnetic radiation is allowed to pass through the square microchannel walls 92. In this instance, the non-wetting droplets functions in much the same fashion as a window blind does, controlling whether or not light is let through a window depending on whether or not the blind is up or down. It could also control particle beams in a similar manner.

FIG. 21 illustrates a much more familiar-looking shutter mechanism that could very easily function in a fashion identical to traditional mechanical shutters. An end bulb 94 is connected to a fill tube 96, and both are filled with a nonwetting liquid hereafter called the working fluid 98 that is opaque for the particular application. A rectangular void 100 is also connected to the fill tube 96, but has a thickness 102 less than the diameter of the fill tube 96. The thickness of the void in this figure is exaggerated for clarity. The shutter with constant void thickness is illustrated in the open configuration in FIGS. 21A and 21B with the incident radiation or particle beam 107 passing through the shutter, and closed in FIGS. 21C and 21D with the incident beam or radiation 107 blocked by the shutter. The void width 104 and void length 106 can be much greater than the void thickness 102 and, in fact, only one void dimension has to be macroscopic in order to carry out a shutter's intended function in the normal macroscopic world. This illustrates an extremely important point. That is, although all the dimensions of a device can be microscopic, only one dimension of a device needs to be in the range where surface tension and wettability become dominate factors in the device's reaction to internal or external stimuli for the device to be considered a microdevice. The rectangular shutter with constant void thickness illustrated in FIGS. 21A and 21B must be considered a microdevice because of the microscopic dimensions of its thickness 102 even though it can have very macroscopic dimensions for one or more of its other features. This is true for all microdevices described herein. In this example, the method of actuation of the rectangular shutter shown in FIG. 21 is derived by an externally-generated electrical current input through a heater 108 contained within the working fluid. As the working fluid 98 expands due to this heat input, any gas bubbles or other gas filled voids contained within the working fluid 98 become compressed, thereby raising the internal pressure, $P_{int}$, within the working fluid 98. This thrusts the internal interface 4 farther and farther into the rectangular void 100. At some point, the radius will decrease sufficiently so that the internal interface will shoot across the void length 106 and thereby closing the shutter in the same fashion as the "YES-NO" devices described earlier in FIG. 4. If no gas bubbles or other gas filled voids are present in the working fluid 98, then the heat input will not cause a "YES-NO" type of reaction, but rather will enable the shutter to close in a more gradual fashion. In this way a partially closed shutter can be maintained by appropriately controlling the heat input. The gradual closing capability can be obtained with pressure-activated shutters by employing a void thickness 102 that has a decreasing taper. A different tapered end 110 is shown at the end of the rectangular void 100 where the working fluid 98 stops in the closed position. This is to minimize water-hammer effects and does not have to be present for the shutter to work as intended. Of course, external pressure or some other external stimuli as well as an internal stimuli could also be used in place of the heater 108 and the shutter would still function. If pressure were employed, it would then in fact be a pressure sensor with some macroscopic dimensions that would be very easy to observe. That is, the filling of the void would signify that a certain pressure had been reached. Obviously there are numerous other applications of this technology but only two others will be mentioned. One involves using a reflective non-wetting fluid so that a mirror results when the void space is filled and the second application encompasses a much larger microscopic void area. That is, if the void space is made as large in area as a window, solar energy acting on the reservoir could be used to force liquid into a void of microscopic dimensions in the window pane and thus block sunlight from going through the window if an opaque non-wetting liquid is employed.

Figure 22A:
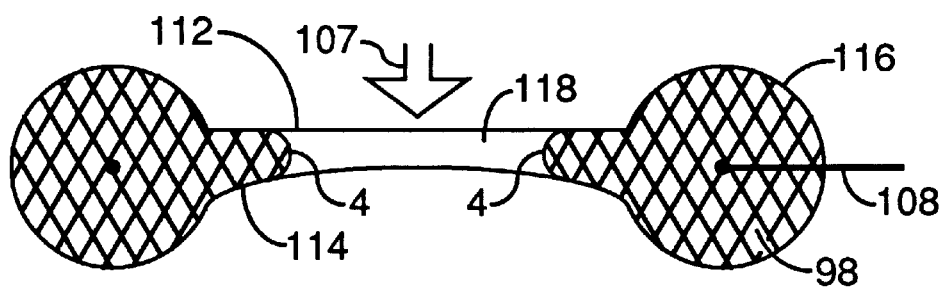
FIGS. 22A to 22B illustrate several views of a circular shutter microdevice.
Figure 22B:
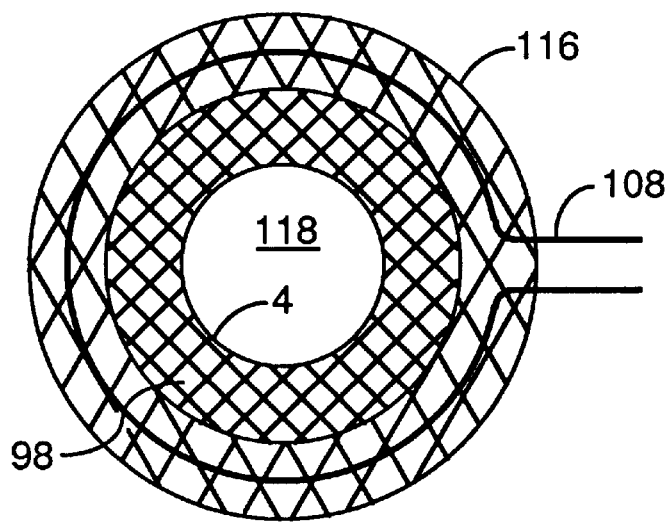

The void shown in FIG. 21 is of constant thickness and is rectangular. Neither parameter is necessary. FIG. 22 illustrates a circular shutter which has a straight top face 112 and a curved bottom face 114 making up the void. Now, depending on the amount of expansion of the working fluid 98 caused by electric power supplied to the heater 108, the shutter can be completely open with the-working fluid 98 all contained within the outside bulb 116, completely shut with no circular gap 118 in the center at all, or anywhere in between as FIG. 22 illustrates. Certainly, both the top face 112 and bottom face 114 can be curved or straight, and virtually any shutter geometry can be employed. Likewise, actuating techniques other than heat input to the working fluid 98 by an internal heater 108 can be used. External heat input by radiation or conduction, or changes in the internal pressure of the working fluid 98 by any other means can be used to achieve the same resulting shutter behavior.

Figure 23:
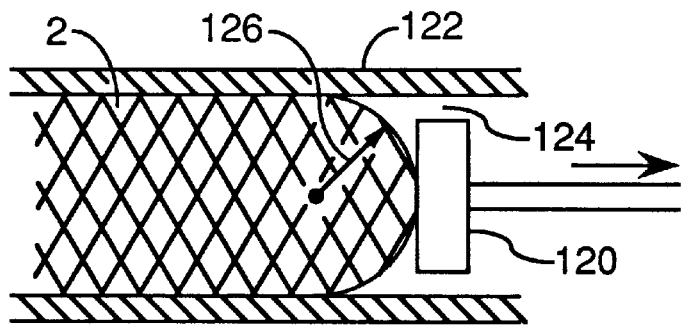
FIG. 23 illustrates a nonwetting droplet moving a piston in a microtube.

FIG. 23 illustrates how the non-wetting droplet 2 can be employed as an actuator, its motion down a microchannel or microtube being used to move a loosely-fitting piston 120. It is important to note that as long as long as the piston 120 and walls 122 are non-wetting to the droplet, none of the droplet will squeeze by the piston if the clearance 124 is less than the non-wetting droplet radius 126. The non-wetting droplet 2 is shown only in part in FIG. 23. That is done deliberately to demonstrate that the actual mechanism i.e. external stimuli, internal stimuli, wetting fluid, etc. causing it to push on the piston 120 is unimportant. Its ability to function as a mechanical means of transmitting force and thereby performing work is all that matters.

Figure 24A:
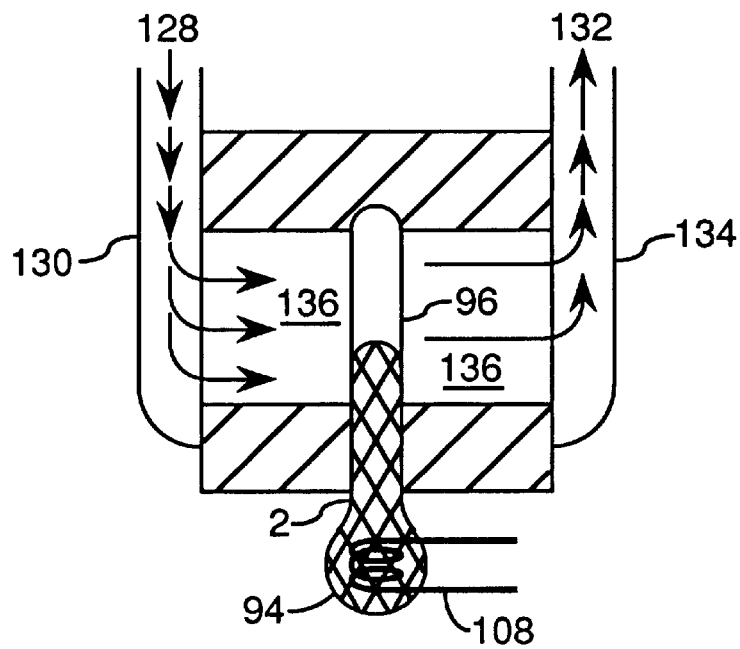
FIGS. 24A and 24B illustrate a microvalve.
Figure 24B:
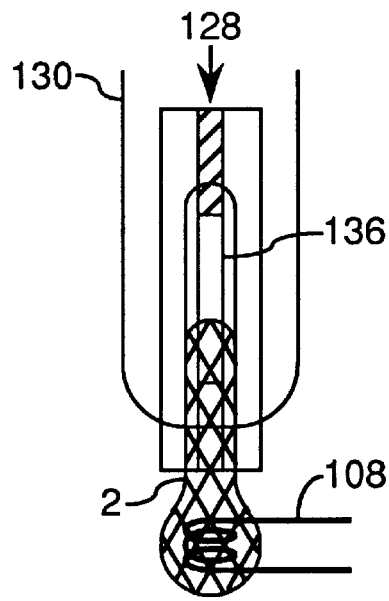

It is important to recognize at this point that it is not even necessary to have an actual mechanism to push against, such as the piston 120 in FIG. 23, in order that the non-wetting droplet 2 perform some task. FIGS. 24A and 24B illustrate a microvalve composed of a fill tube 96 joined to an end bulb 94, with two microchannels 136 being attached to the fill tube 96. In this example, it is the non-wetting droplet that controls the flow of a fluid or gas through a microchannel 136 with a thickness less than that of the fill tube. In this microvalve an inlet fluid 128 flows through an inlet duct 130 and then into one of the microchannels 136. If the fill tube 96 is not blocked by the non-wetting droplet, the inlet fluid traverses the unblocked fill tube at the point where both microchannels attach to it. The fluid then exits the microvalve through an outlet duct 134 as outlet fluid 132. In FIGS. 24A and 24 B, the non-wetting droplet 2 is activated by a heater 108, and only partially fills the fill tube 96. Obviously, many other forms of activation are possible and it is possible to assemble these microvalves together in parallel to control large flows of liquids or gases.

The preceding discussion has indicated that the flow of droplets within microtubes or microchannels can be used not only for purposes of remote sensing, but also for mechanical manipulation within microdevices including tasks such as moving objects, deforming objects, pumping fluids, circulating fluids, and controlling their flow. Obviously complex machines and engines can be produced by the proper joining together of actuator and pumping elements described in this invention.

Some additional concepts which are germane to this patent application but have not been mentioned thus far or described in detail are how microdevices can be filled with droplets, how a microdevice can respond to external stimuli other than pressure; and how droplets contained within microdevice sensors described thus far can perform functions and tasks without any external stimulus.

Figure 25:
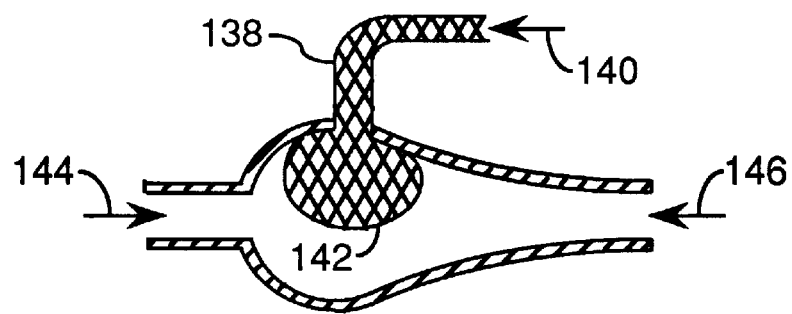
FIG. 25 illustrates the filling of a microdevice cavity through a side port.

FIG. 25 illustrates one technique for introducing a non-wetting droplet into a microdevice pressure sensor similar to those shown in FIG. 1. A sideport 138 has been added to the microdevice through which droplet material 140 is input. The actual non-wetting droplet is shown partially formed 142. The inputting or filling process would of course be continued until the desired drop size was achieved, resulting in the configurations previously used up until now. The entrance port 144 or the device port 146 could also be used for this purpose.

As mentioned earlier, surface tension and wettability govern the position of droplets within microdevices. Thus, in addition to the external stimuli already mentioned, any external stimuli which changes either surface tension of the droplet or wettability of the surface can therefore be detected by a suitably-designed microdevice sensor. Some, but not all, such stimuli include the following: temperature, magnetic field, electrical field, rotation, radiation, and beams of particles.

Up to this point all the microdevice sensors illustrated have been designed to respond to external stimuli. This is not the only mechanism for causing displacement of microdevice droplets. Any compositional change that occurs within droplets themselves or on the walls of microdevices can also change surface tension or wettability. These changes can be either reversible or irreversible and can be caused by a gas or wetting fluid in the device along with the non-wetting droplet. In addition, surface tension of the droplet increases with an increase in both the temperature and rotation. If these or any other internally-induced change to a microdevice's surface tension or wettability occurs, it can be detected and monitored remotely using any of the techniques described previously. Obviously, these internally-induced changes to a microdevice's surface tension or wettability can also be used to move the droplet(s) to perform work.

Up until now, no actual dimensions of either microtubes or microchannels have been discussed. Assuming a non-wetting fluid such as mercury, which has a room-temperature surface tension of approximately 470 dynes/cm and a wettability on glass microdevice walls of roughly 135 degrees, one can calculate the following droplet radii for the indicated internal pressures using Laplace's equation modified to include the effect of wettability:

| $P_{int}$ in lb/in2 | $r_{dev}$ in microns |
|---|---|
| 0.2 | 950 |
| 2.0 | 95 |
| 20 | 9.5 |
| 200 | 0.95 |
| 2,000 | 0.095 |
| 50,000 | 0.003 |

Because most sensing applications of real practical interest lie between these extremes, all microtube and microchannel dimensions between roughly 0.003 microns and 1000 microns are claimed as being pertinent and applicable to all inventions and ideas discussed heretofore.

In conclusion, we have shown that the flow of droplets within microtubes and microchannels that is controlled by surface tension and wettability can be used to sense both qualitatively and quantitatively any environmental factor which acts on a droplet or affects either its surface tension or wettability, or both. This sensing can be performed remotely by a variety of techniques. It has also been demonstrated that non-wetting, partially-wetting, and wetting droplets can all be used interchangeable with only minor device modifications. Static as well as dynamic remote sensing can be performed, and microtubes or microchannels having circular or non-circular cross-sections and variable axial geometries can be employed either individually or together. The reaction of these devices to any stimuli can be tailored by the device geometry and method of sensing resulting in linear and non-linear analog output as well as digital output. The use of this technique in non-sensing applications which perform mechanical functions was also demonstrated. Finally, whenever at least one microdevice dimension lies between 1000 microns and 0.003 microns, it has been shown to be capable of performing all the various tasks discussed heretofore.

Clearly many modifications and variations of the present invention are possible in light of the above teachings and it is therefore understood, that within the inventive scope of the inventive concept, that the invention may be practiced otherwise than specifically claimed.

What is claimed is:

1. A process of selectively responding to at least one external stimulus by a microdevice that is capable of operation in any orientation and is unaffected by many orders-of-magnitude over-actuation, said process comprising the steps of:

exposing the microdevice to said at least one external stimulus;

acting upon at least one droplet of non-wetting fluid in said microdevice by said at least one external stimulus, said at least one droplet being positioned in a cavity of said microdevice;

providing a reaction by said at lest one droplet to said external stimulus; and observing said reaction and/or providing a response to said reaction.

2. A process as defined in claim 1 wherein said at least one external stimulus is selected from the group consisting of: pressure, temperature, gravity, rotation, acceleration, oscillations, magnetic fields, electric fields, radiation, and particle beams.

3. A process as defined in claim 2 in which the magnitude of the external stimulus(i) can far exceed the microdevice's design criteria and yet the microdevice is able to return to its original accuracy and precision after the stimulus(i) is removed.

4. A process as defined in claim 1 wherein said cavity, which may be sealed or have one or more openings, is selected from the group consisting of hollow microtubes having circular or non-circular cross-sectional shapes, channels, and voids having at least one dimension between about 0.003 and 1000 microns.

5. A process as defined in claim 4 in which the shape of the cavity which constrains the droplet determines the function and reaction of the microdevice.

6. A process as defined in claim 4 in which circular microtubes or microchannels are placed in appropriate positions along with non-circular microtubes, micro-channels, or voids so that the non-wetting droplets can act on or be acted upon by either gases or wetting liquids with an efficiency of unity.

7. A process as defined in claim 4 wherein said hollow cavity is provided with a tear-drop-like shape that contains said droplet therein.

8. A process as defined in claim 1 wherein said at least one droplet is composed of a material that wets, does not the interior walls of said cavity, said at least one droplet having an internal pressure greater than 0.1 psi.

9. A process as defined in claim 1 wherein said at least one droplet provides a reaction to said at least one external stimulus by changing shape or moving within the cavity.

10. A process as defined in claim 1 wherein said reaction being observed or said response to said reaction is selected from the group consisting of a digital response of "yes" or "no", a linear analog response, or non-linear analog response as determined by the internal microdevice shape and/or the one or more means used to observe said reaction or said response to said reaction.

11. A process as defined in claim 10 wherein the sensitivity of the one or more means to observe said reaction or said response to said reaction can be pre-set or can be changed by its environment, by an operator, or by a feedback circuit.

12. A process as defined in claim 10 wherein the one or more means to observe said reaction or said response to said reaction includes the step of coating the interior or exterior walls of the cavity with an electrically conductive material.

13. A process as defined in claim 10 wherein the one or more means to observe said reaction or said response to said reaction includes the step of placing at least one probe or contact into or near the cavity or through the cavity wall.

14. A process as defined in claim 10 wherein the one or more means to observe said reaction or said response to said reaction includes the step of allowing for the interaction of an electromagnetic and/or particle beam with the droplet.

15. A process as defined in claim 10 wherein the one or more means to observe said reaction or said response to said reaction includes the step of placing a coil or coils around the cavity.

16. A process as defined in claim 1 in which two or more similar microdevices can be joined together in series or parallel for redundancy.

17. A process as defined in claim 1 in which two or more microdevices can be joined together in series or parallel for multi-range or multi-function capability.

18. A process as defined in claim 1 in which two or more microdevices can be joined together in series or parallel to form complex micro- or macro-devices.

19. A process of selectively responding to at least one internal stimulus by a microdevice, said process comprising the steps of:

acting upon said at least one droplet in said microdevice by said at least one internal stimulus, said at least one droplet being positioned in a cavity of said microdevice;

providing a reaction by said at least one droplet to said internal stimulus; and observing said reaction and/or providing a response to said reaction.

20. A process as defined in claim 19 wherein said at least one internal stimulus is selected from the group consisting of a change in the surface tension of the droplet and/or a change in surface character of the interior walls of the cavity.

21. A process as defined in claim 20 in which the magnitude of the internal stimulus(i) can far exceed the microdevice's design criteria and yet the microdevice is able to return to its original accuracy and precision after the stimulus(i) is removed.

22. A process as defined in claim 19 wherein said cavity, which may be sealed or have one or more openings, is selected from the group consisting of hollow microtubes having circular or non-circular cross-sectional shapes, channels, and voids having at least one dimension between about 0.003 and 1000 microns.

23. A process as defined in claim 22 in which the shape of the cavity which constrains the droplet determines the function of the microdevice.

24. A process as defined in claim 22 in which circular microtubes or microchannels are placed in appropriate positions along with non-circular microtubes, micro-channels, or voids so that the non-wetting droplets can act on or be acted upon by either gases or wetting liquids with an efficiency of unity.

25. A process as defined in claim 22 wherein said microtube is provided with a tear-drop-like shape that contains said droplet therein.

26. A process as defined in claim 19 wherein said at least one droplet is composed of a material that wets, does not the interior walls of said cavity, said at least one droplet having an internal pressure greater than 0.1 psi.

27. A process as defined in claim 19 wherein said at least one droplet provides a reaction to said at least one internal stimulus by changing shape or moving within the cavity.

28. A process as defined in claim 19 wherein said reaction being observed or said response to said reaction is selected from the group consisting of a digital response of "yes" or "no", a linear analog response, or non-linear analog response as determined by the internal microdevice shape and/or the one or more means used to observe said reaction or said response to said reaction.

29. A process as defined in claim 28 wherein the sensitivity of the one or more means to observe said reaction or said response to said reaction can be pre-set or can be changed by its environment, by an operator, or by a feedback circuit.

30. A process as defined in claim 28 wherein the one or more means to observe said reaction or said response to said reaction includes the step of coating the interior or exterior walls of the cavity with an electrically conductive material.

31. A process as defined in claim 28 wherein the one or more means to observe said reaction or said response to said reaction includes the step of placing at least one probe or contact into or near the cavity or through the cavity wall.

32. A process as defined in claim 28 wherein the one or more means to observe said reaction or said response to said reaction includes the step of allowing for the interaction of an electromagnetic and/or particle beam with the droplet.

33. A process as defined in claim 28 wherein the one or more means to observe said reaction or said response to said reaction includes the step of placing a coil or coils around the cavity.

34. A process as defined in claim 19 in which two or more similar microdevices can be joined together in series or parallel for redundancy.

35. A process as defined in claim 19 in which two or more microdevices can be joined together in series or parallel for multi-range or multi-function capability.

36. A process as defined in claim 19 in which two or more microdevices can be joined together in series or parallel to form complex micro- or macro-devices.

37. A process of performing work by a microdevice under internal or external stimuli, said process comprising the steps of:

exposing the microdevice to said at least one external or internal stimulus;

acting upon at least one droplet in said microdevice by said at least one external or internal stimulus, said at least one droplet being positioned in a cavity of said microdevice;

providing a reaction by said at least one droplet to said external or internal stimulus; and using said reaction to perform work including circulation of fluids(s) within said microdevice.

38. A process as defined in claim 37 wherein said at least one external stimulus is selected from the group consisting of: pressure, temperature, gravity, rotation, acceleration, oscillations, magnetic fields, electric fields, radiation, and particle beams.

39. A process as defined in claim 38 in which the magnitude of the external stimulus(i) can far exceed the microdevice's design criteria and yet the microdevice is able to return to its original accuracy and precision after the stimulus(i) is removed.

40. A process as defined in claim 37 wherein said at least one internal stimulus is selected from the group consisting of a change in the surface tension of the droplet and/or a change in surface character of the interior walls of the cavity.

41. A process as defined in claim 37 wherein said at least one droplet is non-wetting and the internal stimulus is a fluid, gas, or movable solid object.

42. A process as defined in claim 37 wherein said cavity, which may be sealed or have one or more openings, is selected from the group consisting of hollow microtubes having circular or non-circular cross-sectional shapes, channels, and voids having at least one dimension between about 0.003 and 1000 microns.

43. A process as defined in claim 42 in which the shape of the cavity which constrains the droplet determines the function of the microdevice.

44. A process as defined in claim 42 in which circular microtubes or microchannels are placed in appropriate positions along with non-circular microtubes, micro-channels, or voids so that the non-wetting or partially wetting droplets can act on or be acted upon by either gases or wetting liquids with an efficiency of unity.

45. A process as defined in claim 42 wherein said microtube is provided with a tear-drop-like shape that contains said droplet therein.

46. A process as defined in claim 45 wherein the said reaction of said at least one droplet performs work on a fluid, gas, or solid deformable or movable object.

47. A process as defined in claim 45 wherein the said reaction of said at least one droplet performs work on a fluid, gas, or solid deformable or movable object.

48. A process as defined in claim 37 wherein said at least one droplet is composed of a material that wets, does not the interior walls of said cavity, said at least one droplet having an internal pressure greater than 0.1 psi.

49. A process as defined in claim 37 wherein said at least one droplet provides a reaction to said at least one external stimulus by changing shape or moving within the cavity.

50. A process as defined in claim 37 wherein said at least one droplet provides a reaction to said at least one internal stimulus by changing shape or moving within the cavity.

51. A process as defined in claim 37 in which two or more microdevices can be joined together in series or parallel to perform complex tasks.

* * * * *